United States Patent [19]

Schaefer

[11] Patent Number: 4,718,110

[45] Date of Patent: Jan. 5, 1988

[54] PORTABLE TWO WAY RADIO WITH SPLIT UNIVERSAL DEVICE CONNECTOR APPARATUS

[75] Inventor: Henry A. Schaefer, Lynchburg, Va.

[73] Assignee: General Electric Company, Lynchburg, Va.

[21] Appl. No.: 791,022

[22] Filed: Oct. 24, 1985

[51] Int. Cl.⁴ .............................................. H04B 1/38
[52] U.S. Cl. ........................................ 455/90; 455/89;
455/95; 455/128; 455/347; 455/349; 455/351
[58] Field of Search ................. 455/89, 90, 95, 128,
455/347, 348, 349, 351

[56] References Cited

U.S. PATENT DOCUMENTS

| | | | |
|---|---|---|---|
| 1,968,557 | 7/1934 | Johanson | 250/14 |
| 2,560,320 | 7/1951 | Winkler | 250/16 |
| 2,963,577 | 12/1960 | Errichiello et al. | 455/349 |
| 3,090,027 | 5/1963 | Philips et al. | 339/31 |
| 3,102,248 | 8/1963 | Temple | 338/274 |
| 3,504,188 | 3/1970 | Ficker | 307/18 |
| 3,614,629 | 10/1971 | Sues | 325/355 |
| 3,720,874 | 3/1973 | Gorcik et al. | |
| 4,012,672 | 3/1977 | Douglass et al. | 455/349 |
| 4,073,564 | 2/1978 | Davis, Jr. | 339/157 |
| 4,131,851 | 12/1978 | Martiny et al. | 455/349 |
| 4,177,426 | 12/1979 | Gaishim et al. | 325/37 |
| 4,286,335 | 8/1981 | Eichler et al. | |
| 4,578,739 | 3/1986 | McKee et al. | 455/349 |

OTHER PUBLICATIONS

Funkschau, No. 16, Aug. 1984, Munchen (DE) H. Winklemann: "Sprechfunk Nach Mass", pp. 41–43.
Nachrichten Electronik & Telematik, vol. 38, No. 4, Apr. 1984, Heidelberg (DE) S. Recklies: "Handsprechfunkgerate fur den Weltmarkt", pp. 134–137.
Philips Telecommunication Reviews, vol. 42, No. 2, Jun. 1984, Hilversum (NL) Q. Reni et al: "PFX, a New Universal Portable", pp. 49–62.
Philips Telecommunication Review, vol. 41, No. 3, Sep. 1983, Hilversum (NL) J. McLean: "A New Family of FM Portables", pp. 250–256.
Patent Abstracts of Japan, vol. 7, No. 214, (E-199)(1359) Sep. 21, 1983, & JP, A, 58-106920 (Matsushita Denki Sangyo k.k.) Jun. 25, 1983.

Primary Examiner—Robert L. Griffin
Assistant Examiner—Elissa Seidenglanz
Attorney, Agent, or Firm—Nixon & Vanderhye

[57] ABSTRACT

An improved portable two-way radio comprises a systems module and a removably connected, shielded RF module. Split universal device connector apparatus is provided having an RF connector portion associated entirely with the shielded RF module and a control connector portion associated entirely with the control module, the RF and control connector portions being located physically proximate to each other so that a single multi-pronged universal device connector can be electrically and mechanically connected to both the RF connector circuitry through the control systems module.

10 Claims, 5 Drawing Figures

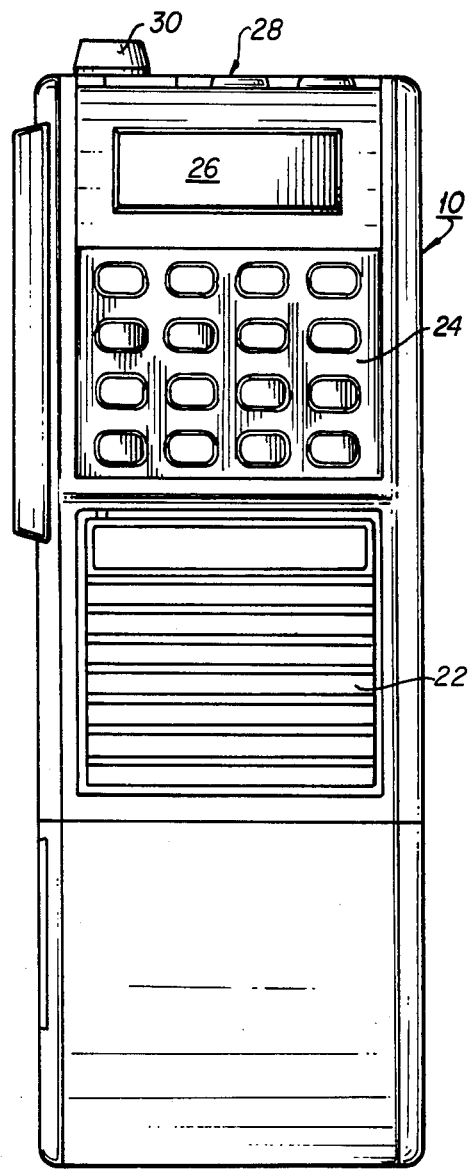

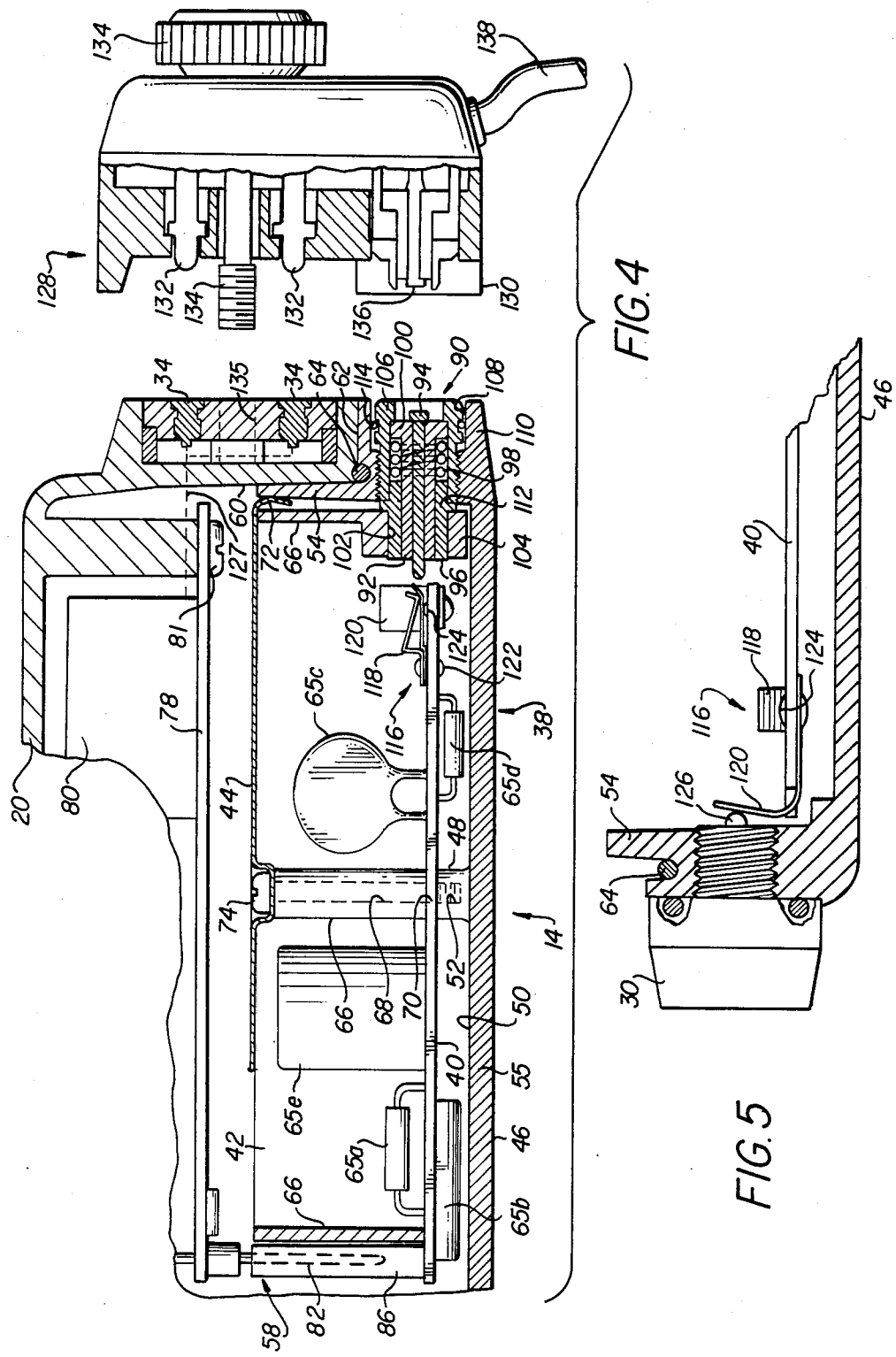

PORTABLE TWO WAY RADIO WITH SPLIT UNIVERSAL DEVICE CONNECTOR APPARATUS

BACKGROUND OF THE INVENTION

The present invention relates to two-way radios and, more particularly, to a portable two-way radio with a removable RF module and improved means for connecting accessories to the radio and module.

There is a need for a light-weight portable, two-way radio of compact size with high power output. One of the difficulties in designing such a radio is that the solutions for isolating high gain RF signals are inconsistent with the desire for compactness. Adequate shielding for signal isolation typically requires excessive component separation, thus increasing the size of the radio, or complex shielding arrangements which add weight and, to some extent, increase radio size. It is generally agreed that RF shielding in small radios has not been totally effective.

In addition, there is desire to be able to connect an increasingly complex array of accessories to portable two-way radios. Modern two-way radios are powerful devices, containing microprocessors which enable the radios to perform a multitude of functions and to operate with a host of accessories. For example, a portable radio can be provided with an accessory comprising a small remote microphone and speaker (and, perhaps, a remote antenna) whereby the user can communicate through the small hand-held accessory while keeping the larger portable radio affixed to a belt, or, the portable radio can fit into an automobile adaptor which connects the radio to the automobile's battery and antenna system, thereby turning a hand-held portable radio into a more powerful mobile unit. The problem of accessory adaptability further complicates the problem of keeping the radio compact and light weight. This is because it is desirable to have all external radio connections made at one location on the radio, albeit through multiple electrical connections through a single multi-pronged electrical plug (commonly referred to as a "universal device connector") configured to mate with cooperating radio contacts. Heretofore, this has necessitated the routing of some RF circuitry through the control section of the radio to the external connection point, further necessitating complex shielding arrangements to insure that any RF radiation leakage does not interfere with the control signalling.

Underlying all of the foregoing problems is the further desire to have an easily maintainable radio—one which is modular in design so as to permit the relatively easy replacement of defective components. Typically, integrating more functions and components into a radio has increased its complexity and decreased its ease of maintainability.

SUMMARY OF THE INVENTION

Accordingly, it is the primary object of the present invention to provide a portable two-way radio with improved universal device connector apparatus for easily connecting the radio to a host of accessories.

It is another object of the present invention to isolate the RF portion of the universal device connector apparatus in the RF section of the radio, thus eliminating the necessity of routing some RF circuitry through the control portion of the radio.

It is yet another object of the present invention to maintain the existing feature of a single universal device connector configuration for all radio accessories.

It is still another object of the present invention to provide the foregoing in a modular protable two-way radio which offers relatively easy maintainability.

These and other objects and advantages will be more clearly understood from the following detailed description, drawings and specific examples, all of which are intended to be typical of rather than in any way limiting to the scope of the present invention.

Briefly stated, the above objectives are accomplished in one embodiment of the present invention in which a portable two-way radio comprises two modules. One module is a controls systems module containing the controls necessary to operate radio functions such as volume and channel control, push-to-talk (PTT) button, keyboard, speaker, microphone, and others. The other module is the RF module containing the transmitter and receiver portions of the radio, including the antenna. The portion of the radio to which the universal device connector is connected is split, with those contacts associated with the control functions (to which they are electrically connected) being located on the exterior of this control systems module casing. The universal device contact associated with the RF module (namely, the RF connector) is located on the RF systems module, and the universal device connector contacts associated with both modules are located physically adjacent to each other on their respective modules such that a single multi-pronged universal device connector (UDC) can be electrically connected to both the RF and control systems modules.

The RF module is removably connected to the control systems module, both mechanically and electrically. The RF module comprises a hollow rear cover casting having an integral upstanding web around its periphery which is received by the control systems module front casting to ensure proper component alignment, weather sealing and to carry structural loads. A transeiver component board is sandwiched and captured between honeycomb shielding integrally formed on the inside of the rear cover casting and a separate honeycomb casting which provides further shielding of the RF components on its side of the transceiver board. All electrical connection between the RF and control modules occurs through a multi-pin interconnector associated with the control module and a cooperating male bus connector on the RF module's tranceiver board. Because of the unique split UDC connector arrangement, it is unnecessary to route any portion of the RF connector circuitry through the control module, thus solving one of the major shielding problems in the radio. Shielding of the RF module is completed with the installation of a thin metallic shield cover over the open end of the rear cover casting, thereby completely enclosing the RF module in a metal housing. The RF module is easily removable from the control systems module by means of a small number of screws and/or bolts, thus improving maintainability of the radio.

BRIEF DESCRIPTION OF THE DRAWINGS

While the specification concludes with claims particularly pointing out and distinctly claiming the subject matter which is regarded as part of the present invention, it is believed that the invention will be more fully understood from the following description of the preferred embodiment which is given by way of example with the accompanying drawings in which:

FIG. 1 is a front view of a portable two-way radio constructed in accordance with the present invention:

FIG. 2 is a side view of the radio of FIG. 1:

FIG. 4 is a cross sectional view of a portion of the radio of the present invention illustrating the construction of the RF module in particular, and;

FIG. 5 is a cross sectional view of an external RF connector according to the present invention.

DESCRIPTION OF THE PREFERRED EMBODIMENT

Figure 3:
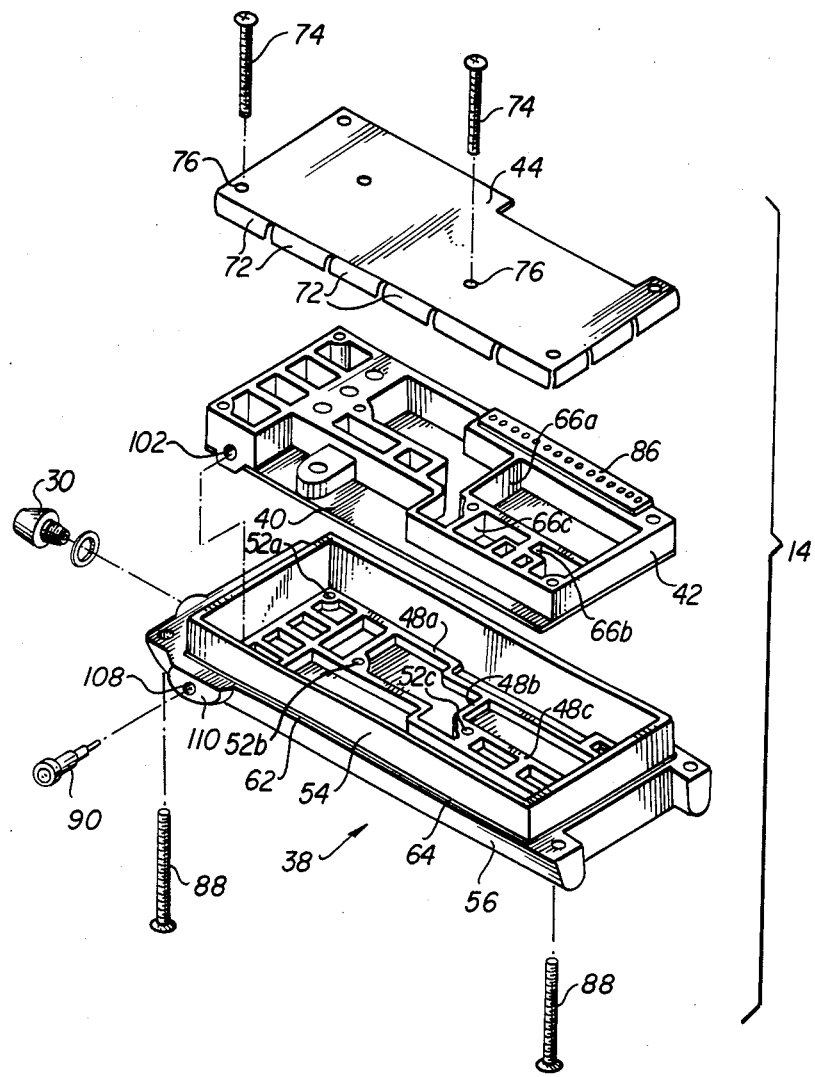
FIG. 3 is an exploded perspective view of the radio of FIGS. 1 and 2 in which the orientation of various components within the RF module is more clearly depicted.

Referring to the drawings wherein like numerals correspond to like elements throughout, attention is first directed to FIGS. 1 and 2 wherein a portable two-way radio 10 embodying the present invention is illustrated. Such a radio comprises a radio portion 12 which includes a transmitter and receiver (or transceiver) in RF module 14 and associated electronic control equipment in control module 16. A battery pack 18 is removably attached to and powers radio portion 12. Control module 16 is provided with a generally rectangular front housing 20 which has a speaker and microphone portion 22, a keypad 24 for "dialing" or calling selected other radios or telephones, an LCD display window 26 for displaying called numbers and other programmed information in all lighting conditions, a control panel 28 on the top of housing 20 having switches, controls, knobs, lights and the like for controlling and monitoring the various radio functions, and a screw-in antenna connector 30 for an antenna 31 with which to receive and radiate a radio signal. The particular controls located on control panel 28 are unimportant to the present invention, it being recognized that different radios serve different purposes—thus, the controls and their configuration are likely to be different. What they have in common, however, is the fact that they are typically located together, in what is herein referred to as control module 16. Push-to-talk button 32 is located on the side of control module 16 just below the external control contacts 34 which mate with a universal device connector (UDC) as will be described in greater detail hereinafter. The radio ON-OFF switch 36 is associated with battery pack 18, the circuitry and operation of which is more completely described in copending, commonly-assigned patent application Ser. No. 790,903 filed Oct. 24, 1985. entitled "Portable Radio Battery Pack with ON-OFF Switch", the subject matter of which is incorporated herein by reference. Basically, incorporation of switch 36 in the battery pack instead of control module 16 means that an electrical conductor does not have to be routed from the radio's battery contacts to the switch, and thereafter to a radio systems connection and/or distribution point in control module 16. This makes the radio simpler, smaller and easier to maintain.

Referring now to FIG. 3, RF module 14 is depicted in an exploded view in order to more clearly show the relationship of the major components comprising the module. These components are rear cover 38, transceiver board assembly 40, honeycomb shielding 42, and shield cover 44 which together comprise the generally rectangular RF module 14. Referring also to FIG. 4, rear cover 38 is shown to comprise a thin, hollow structural casting made of a metal such as magnesium, preferably plated with copper and nickel, and painted on the outside surface for aesthetic reasons. The rear cover comprises a back wall 55 and upstanding side walls 56 forming an open-ended cavity. The outer face 46 of back wall 55 is typically plain but may have a carrying clip (not shown) attached thereto. To its interior, back wall 55 has integral laterally and longitudinally extending upstanding ribs 48 (i.e., 48a, 48b, 48c...) forming a honeycomb grid on the inner surface 50 which serves to shield individual components on its side of transceiver board assembly 40. Some of the ribs 48 are provided with integrally cast bolt-screw holes 52 (52a, 52b,...).

An integral upstanding web 54 surrounding the hollow interior cavity of rear cover casting 38 performs a number of functions. It provides an upward extension of thicker side walls 56 to help electrically isolate the RF module, it pilots rear cover casting 38 into proper alignment with front housing 20, it takes loading off the electrical interconnect 58 between the RF and control modules by absorbing lateral shear loads, and it provides a deep weatherproofing lip to keep moisture and other foreign matter out of the interior of RF module 14. Upstanding web 54 is received by a downward extending flange 60 of front housing 20, flange 60 bottoming against step 62 between thicker walls 56 and web 54, and compressing therebetween sealing gasket 64. Gasket 64 rests in a contoured groove encircling web 54 and serves to further seal the interior of radio portion 12.

Transceiver board 40 is laid upon the tops of ribs 48 in spaced relationship to the inside surface 50 of rear cover casting 38 so as to provide room for the transceiver electronic components 65a... 65e (such as the frequency synthesizer circuit) which are typically mounted and interconnected on both sides of the insulated board. In the case of the lower side of transceiver board 40, certain of the electronic components are shielded from each other and stray RF by the metal ribs 48 and side walls 56. Thus, the configuration of ribs 48 will be dictated in each case by the shielding requirements of the transceiver board components and also by the need to provide adequate support for the board. Abutting the other side of tranceiver board 40 is the honeycomb/eggcrate shield 42 which is preferrably a thin-walled metal casting of zinc finished with a highly conductive, solderable protective plating such as Albaloy, a trademarked product of M&T Chemicals, Inc. Shield 42 comprises an array of open ended cells (the top and bottom are open) configured to receive particular electronic components, circuits, or portions thereof on the other side of transceiver board 40 which are desired to be shielded from each other. Thus, like ribs 48, shielding requirements dictate the placement of cell walls 66 (ie., 66a, 66b, 66c...) of shield 42. A number of the cell walls are provided with bolt holes 68 which align with rib bolt holes 52 and cooperating holes 70 in transceiver board 40.

The top of RF module 14 is enclosed by shield cover 44 made of thin spring metal such as phosphor bronze or nickel silver. Shield cover 44 is provided with a plurality of spring fingers 72 which wrap around the side walls 66 of honeycomb shield 42 and engage, in a press-fit relationship, the inside of upstanding web 54 which is spaced away from honeycomb shield 42 by an amount sufficient to permit the fit. Cover screws 74 are inserted through holes 76 in the shield cover, through mating holes 68, 70 and threaded into rear cover casting rib holes 52 to tie the RF module 14 together. It is essential that the transceiver board 40 be tied down firmly to prevent vibration which could upset operation of sensitive components such as the frequency synthesizer circuit which is mounted on the board. By sandwiching the transceiver board firmly between honeycomb shield 42 and rear cover casting ribs 48, and then firmly tying the assembly together with strategically placed long cover screws 74, vibration of the electrical components of board 40 is minimized.

FIG. 4 further illustrates a controller board 78, also having electronic circuitry 80 mounted thereon, firmly mounted within front cover housing 20 by means of bolts 81 holding the controller board in spaced relationship with RF module 14 and, in particular, in spaced relationship with cover 44. Electrical connection between controller board 78 and transceiver board 40 is accomplished entirely by means of electrical interconnect 58 which comprises a plurality of downwardly projecting pins 82 attached to controller boards 78 and a plurality of cooperating female jacks in the form of bus 86 interconnected with transceiver board 40. Thus, the RF module is easily removable from the control module by merely removing four screws 88 (FIG. 3), holding the four corners of the two modules together and pulling the two modules apart, thereby disconnecting pins 82 from bus 86.

RF module 14 is further provided with an external RF connector 90 which is used to electrically disconnect the transceiver board 40 from the external antenna which is screwed into antenna connector 30 and to connect it to other equipment such as an automobile antenna through a vehicular charger as is well known in the art. A problem is that RF connector 90 is one of the most sensitive parts of the radio in that it is the point where all RF energy enters and leaves the radio. When the RF connector is associated with the control circuitry, as is the case in the prior art, it requires a great deal of shielding to prevent stray RF from interfering with the control circuitry. The concept of a sealed RF module enables the circuitry associated with RF connector 90 to be contained entirely within the sealed, shielded module, thereby solving all the RF leakage problems.

RF connector 90 comprises a slideable insulator 92 carrying a central metal conductor pin 94. Insulator 92 is urged out of surrounding collar 96 by a spring 98 disposed between collar 96 and an expanded head portion 100 of insulator 92. Collar 96 is received within an aperture 102 through a thickened portion 104 of honeycomb shield sidewall 66 and retained in position by threaded retainer 106 which is screwed into threaded hole 108 through boss 110 formed on the side of rear cover casting 38 and which urges collar flange 112 against the honeycomb shield. An O-ring 114 inhibits the entry of moisture into the RF connector area.

An antenna changeover switch 116 comprising a pair of spring contacts 118, 120 disposed at right angles to each other is electrically and mechanically connected to transceiver board 40 and spaced away from the protruding end of metal conductor pin 94 by an amount less than the travel of insulator 92 within threaded retainer 106. Thus, when the insulator/pin assembly is urged to the left in FIG. 4 so as to overcome the biasing of spring 98, conductor pin 94 engages spring contact 118 of changeover switch 116.

The electrical connection between changeover switch 116 and transceiver board 40 occurs at 122 with the normal conduction path being through spring contact 118, metal button 124 and spring contact 120 to central conductor pin 126 of the threaded antenna connector 30 (FIG. 5), thereby electrically connecting the antenna connector (and antenna 31) to the transceiver board. If it is desired to use an external antenna, an appropriate plug is inserted into RF connector 90, thereby forcing pin 94 against spring contact 118, interrupting the electrical contact between spring 118 and button 124 and electrically disconnecting spring contact 120 from transceiver board 40. Thus, central conductor pin 94 of RF connector 90 is placed in electrical connection with RF transceiver board 40 in lieu of antenna connector 30.

External control contacts 34 for the control module 16 are located on the side of housing 20 in a thickened wall section proximate RF connector 90 as shown in FIG. 2. These metal contacts are electrically connected via a flex strip interconnect 127 to controller board 78 and provide interface for external speakers, microphone, push-to-talk switch, battery charger, radio programmer and the like. Because all external connection to the radio can be made only through control contacts 34 and RF connector 90 which are located in close proximity to each other, all external connections may be made with a single universal device connector (UDC) 128 which spans modules 14, 20.

As shown in FIG. 4, UDC 128 comprises a housing 130 of insulating material such as Lexan polycarbonate resin encasing a plurality of electrical prongs 132 oriented to touch mating contacts 34 as the UDC is brought into contact with the radio. The UDC is retained in place by means of thumb screw 134 and cooperating threaded aperture 135. At the same time, another prong in the form of pin 136 is inserted into RF connector 90 to disconnect radio antenna connector 30 from the transceiver board 40 in favor of an external antenna connected to the UDC via cable 138. All accessories and other devices to be connected to the radio 10 will have their connection made by means of a universal device connector of a type similar to that depicted in FIG. 4. Depending of the type of accessory or device to be connected, its UDC may have one or more of its prongs dummied or missing, it being recognized that particular ones of contacts 34 are meant to affect particular control functions and that electrical connection with only those contacts 34 need be effected by the UDC. Thus, while there is no reason for all UDCs not to look alike externally, they may differ circuit-wise depending on the particular accessory or device with which they are associated.

Thus, what has been provided is a split universal device connector apparatus wherein the RF connector portion 90 is associated entirely with the shielded, sealed RF module 14, and the control connector portion (comprising control contacts 34) is associated entirely with the control module 16, the RF and control connector portions being located physically adjacent to each other on their respective housings (rear cover casting 46 and control housing 20, respectively) so that a single multi-pronged UDC connector 128 can be electrically connected to both the RF and control systems modules.

We have also provided a radio with a self contained, easily replacable RF module which provides for much better shielding of RF components from the controls module of the radio while at the same time simplifying the design and miniturizing the system because the requirement for bulky RF shielding in the controls module has been eliminated. The RF module and controls module are easily disconnected by means of our electrical interconnect 58.

The best mode contemplated for carrying out this invention has been set forth in the description above. It should be obvious, however, to one skilled in the art that certain changes can be made to the above-described invention without departing from the broad inventive concepts thereof. It is intended that appended claims cover such variations in the present inventions broader inventive concepts.

Having thus described the invention, what is claimed and desired to be secured by Letters Patent of the United States is:

1. An improved portable two-way radio comprising:
   a control systems module;
   a shielded RF module removably connected, both electrically and physically, to said control system module and, when so connected together, said RF module and control system module providing an operative two-way radio circuit; and
   split universal device contacts having a first part thereof associated with said control systems module and a second part thereof associated with said RF module and including an RF connector, for making external electrical contact with further control and RF circuits respectively.
   said first and second parts being located physically proximate to each other on their respective modules such that a single multi-pronged plug associated with said further circuits can be electrically connected to both said first and second parts.

2. An improved portable two-way radio comprising: a control systems module having means for controlling a plurality of radio functions; a control system connector electrically coupled to said controls; an RF module removably attached to said control systems module, said RF module comprising a transceiver assembly in a shielded metal housing and having associated therewith an RF connector electrically coupled to said transceiver assembly, said RF and control system connectors being located physically adjacent to each other such that a single multi-pronged plug can be electrically connected to both portions; and means for electrically connecting said control systems module and said RF module.

3. An improved portable two-way radio comprising; a control systems module housing means for controlling a plurality of radio functions, and having a plurality of externally mounted electrical contacts for remotely controlling said radio functions; an RF module removably attached to said control systems module, said RF module containing a transceiver assembly in a shielded housing and having associated therewith at least one external RF contact electrically connected to said transceiver assembly, said RF contact being located physically adjacent to said plurality of control systems contacts such that a single multi-pronged plug can be electrically connected to all said contacts; and means for electrically connecting said control systems module and said RF module.

4. An improved portable two-way radio comprising: a control systems module including; a thin-walled front cover defining an interior cavity containing a controller board assembly; and means electrically connected to said controller board assembly for controlling a plurality of radio functions; and an RF module removably attached to said control systems module comprising a shielded metal housing containing a transceiver assembly and means electrically connected to said transceiver assembly for conducting RF power into and out of said RF module without passing through said control module; wherein said controlling means and said RF power conducting means are located physically adjacent to each other on their respective modules such that a single multi-pronged connector plug can be electrically connected to both said controlling means and said RF power conducting means.

5. The improved radio of claim 1 further comprising means for electrically connecting said control systems module and said RF module.

6. An improved radio comprising:
   a control systems module;
   a shielded RF module removably connected to said control systems module; and
   split universal device contacts having a first part thereof associated with said control systems module and a second part thereof associated with said RF module,
   said first and second parts being located physically proximate to each other on their respective modules such that a single multi-pronged plug can be electrically connected to both said first and second parts;
   wherein said RF module comprises
      a rear cover having a back wall and attached sidewalls defining a cavity, said back wall having on the inside thereof a plurality of ribs forming a honeycomb grid;
      a honeycomb shield disposed within said cavity;
      a transceiver board having electronic components mounted on both sides thereof, said transceiver board being sandwiched between said honeycomb shield and said rear cover such that some of said electronic components are at least partially received within said honeycomb grid and said honeycomb shield,
      a shield cover closing the otherwise open end of said cavity; and
      means connecting said shield cover to said rear cover.

7. An improved radio comprising:
   a control systems module;
   a shielded RF module removably connected to said control systems module; and
   split universal device contacts having a first part thereof associated with said control systems module and a second part thereof associated with said RF module,
   said first and second parts being located physically proximate to each other on their respective modules such that a single multi-pronged plug can be electrically connected to both said first and second parts;
   wherein said RF module comprises
      a transceiver;
      an antenna;
      a RF connector comprising said second part of said split universal device contacts; and
      an antenna changover switch alternatively connecting said RF connector to said transceiver when said multi-pronged plug is connected to said transceiver, and connecting said antenna to said transceiver when said multi-pronged plug is disconnected.

8. The improved radio of claim 6 including:
   an antenna; and an antenna changeover switch for normally connecting said transceiver board to said antenna and for alternatively connecting said transceiver board to said first part of said split universal device contacts when said multipronged plug is connected to said radio.

9. The improved radio of claim 6 further comprising means for electrically connecting said control systems module and said RF module.

10. The improved radio of claim 9 wherein said control systems module includes an electronic controller board, and wherein said electrical connecting means comprises a plurality of projecting pins electrically connected to said controller board and a plurality of mating jacks electrically connected to said transceiver board.

* * * * *